(12) United States Patent
Newhouse et al.

(10) Patent No.: US 6,273,192 B1
(45) Date of Patent: Aug. 14, 2001

(54) METHOD FOR STRENGTHENING A SUBTERRANEAN FORMATION

(75) Inventors: Daniel P. Newhouse, Spring; Gangerico G. Ramos, Allen, both of TX (US)

(73) Assignee: Atlantic Richfield Company, Chicago, IL (US)

( * ) Notice: Subject to any disclaimer, the term of this patent is extended or adjusted under 35 U.S.C. 154(b) by 0 days.

(21) Appl. No.: 09/537,153

(22) Filed: Mar. 29, 2000

Related U.S. Application Data

(63) Continuation of application No. 09/095,281, filed on Jun. 10, 1998.

(51) Int. Cl.$^7$ .................................................. E21B 33/13
(52) U.S. Cl. ..................................... 166/294; 166/270
(58) Field of Search ...................... 166/295, 294, 166/270, 400–403

(56) References Cited

U.S. PATENT DOCUMENTS

| | | | |
|---|---|---|---|
| 2,842,205 | 7/1958 | Allen et al. | 166/21 |
| 2,968,572 | 1/1961 | Peeler | 106/74 |
| 3,306,756 | 2/1967 | Miller | 106/84 |
| 3,306,758 | 2/1967 | Miller | 106/84 |
| 3,449,139 | 6/1969 | Kuhn | 106/84 |
| 3,882,938 | 5/1975 | Bernard | 166/270 |
| 4,293,340 | 10/1981 | Metz | 106/74 |
| 4,354,874 | 10/1982 | Vickers | 106/74 |
| 4,354,875 | 10/1982 | Powers et al. | 106/74 |
| 4,384,894 | 5/1983 | Vickers et al. | 106/80 |
| 4,494,606 | 1/1985 | Sydansk | 166/295 |
| 4,683,949 | 8/1987 | Sydansk et al. | 166/270 |
| 4,724,906 | 2/1988 | Sydansk | 166/295 |
| 4,730,675 | 3/1988 | Wygant et al. | 166/295 |
| 4,770,245 | 9/1988 | Sydansk | 166/295 |
| 4,968,442 | 11/1990 | Falk | 252/8.551 |
| 4,986,356 | 1/1991 | Lockhart et al. | 166/300 |
| 5,002,431 | 3/1991 | Heymans et al. | 405/128 |
| 5,010,954 | 4/1991 | Falk | 166/295 |
| 5,048,609 | 9/1991 | Tacket, Jr. et al. | 166/295 |
| 5,082,057 | 1/1992 | Sydansk | 166/295 |
| 5,178,218 | 1/1993 | Dees | 165/281 |
| 5,190,104 | 3/1993 | Shu | 166/294 |
| 5,201,612 | 4/1993 | Gadelle et al. | 405/264 |
| 5,314,019 | 5/1994 | Honarpour | 166/270 |
| 5,338,465 | 8/1994 | Lockhart et al. | 252/8.551 |
| 5,404,951 | 4/1995 | Lai et al. | 166/295 |

OTHER PUBLICATIONS

SPE/DOE 17329 "A New Conformance–Importance–Treatment Chromium (III) Gel Technology", by R. D. Sydansk; Society of Petroleum Engineers, Inc./U.S. Department of Energy, Apr. 20, 1998.

*Primary Examiner*—David Bagnell
*Assistant Examiner*—Zakiya Walker
(74) *Attorney, Agent, or Firm*—F. Lindsey Scott; Robert Sloat

(57) ABSTRACT

A method for strengthening a subterranean formation by injecting an aqueous gellable composition containing a cross-linkable polymer into the subterranean formation through a wellbore to increase the strength of the subterranean formation while retaining the ability of the subterranean formation to produce fluids.

18 Claims, 1 Drawing Sheet

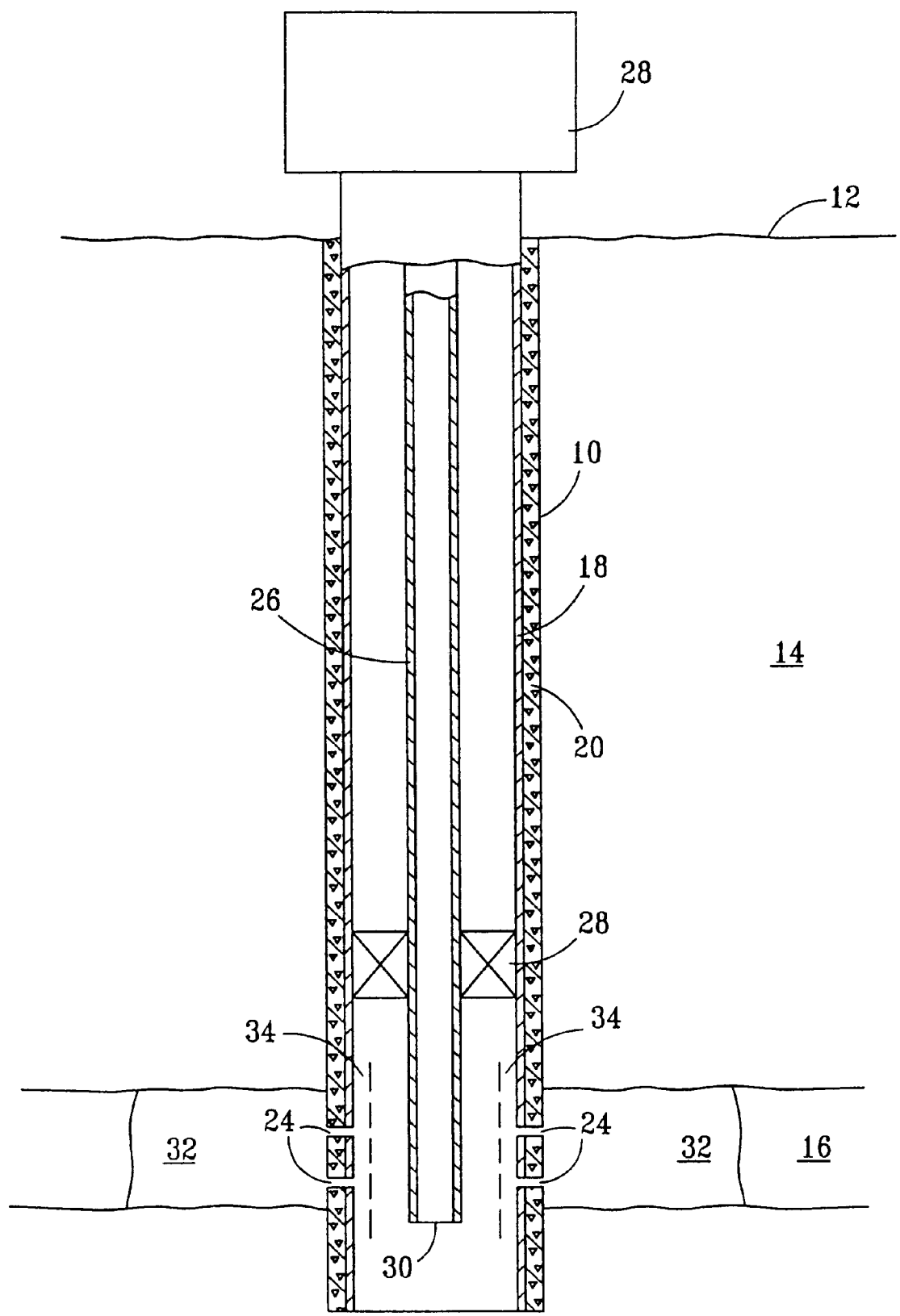

METHOD FOR STRENGTHENING A SUBTERRANEAN FORMATION

This is a continuation, of application Ser. No. 09/095,281 filed Jun. 10 1998.

FIELD OF THE INVENTION

This invention relates to a method for strengthening a subterranean formation by injecting an aqueous gellable composition containing a cross-linkable polymer into the formation through a wellbore to increase the strength of the subterranean formation while retaining and improving the ability of the subterranean formation to produce fluids into the wellbore and inhibit the production of sand and other finely-divided particulate solids.

BACKGROUND OF THE INVENTIONS

It is well known in the petroleum industry that some hydrocarbon-bearing formations are weakly consolidated or, in fact, may be unconsolidated formations. While such formations are known to contain substantial quantities of oil and gas, the production of oil and gas from these formations is difficult because of the movement of particulates such as sand particles and other finely divided particulate solids from the unconsolidated or weakly consolidated formation into the wellbore. This movement is a result of the movement of fluids and may be a result of the differential pressure between the formation and the wellbore created by pumping or by the production of fluids upwardly through the wellbore. Some formations are weakly consolidated or unconsolidated initially and others become weakly consolidated as a result of the production of fluids from the formation, especially when water is present in the produced fluid. Formations of this type are formations which are, at least in part, consolidated by the presence of clays in the formation. Such clays can become dispersed and expanded by the production of aqueous fluids from the formation, thereby weakening the overall formation to the point where it becomes unconsolidated or weakly consolidated with the resulting production of particulates into the wellbore. As a result, uncemented, weakly consolidated or unconsolidated formations impose limits on the draw-down pressure which can be used to produce fluids from the formation. This limits the rate at which fluids can be produced from the subterranean formation.

One approach used to prevent the movement of particulates into the wellbore is the use of gravel packs. Gravel packs comprise a gravel sheath positioned around the inside of a casing, slotted liner, perforated casing or the like, or the wellbore in an open hole through the producing formation to limit the production of particulate materials from the weakly consolidated or unconsolidated subterranean formation. Gravel packs can be effective when the gravel pack sand is approximately six times the size of formation sand.

The positioning of gravel packs is expensive and requires that the well be shut down for a period of time while a work-over rig is placed over the well to pull and run the tubing. The formation may also be damaged by the operations necessary to place the gravel pack. As a result, it is relatively expensive to position gravel packs in wells to prevent the flow of particulate matter from unconsolidated or weakly consolidated formations into the wellbore.

Accordingly, improved methods have been sought for strengthening subterranean formations to inhibit the production of sand and other finely divided particulate material into the wellbore while still maintaining the ability of the formation to produce fluids into the wellbore.

SUMMARY OF THE INVENTION

It has now been found that a subterranean formation can be strengthened by injecting an aqueous gellable composition containing a cross-linkable polymer into the formation through a wellbore to increase the strength of the subterranean formation while retaining the ability of the subterranean formation to produce fluids. The method consists essentially of injecting a quantity of the aqueous gellable composition into the subterranean formation in at least two portions and injecting a quantity of a non-gellable fluid into the subterranean formation between the two portions.

BRIEF DESCRIPTION OF THE DRAWING

The figure is a schematic diagram of a wellbore including a casing and a tubing which penetrates a weakly consolidated subterranean formation for the production of fluids therefrom.

DESCRIPTION OF THE PREFERRED EMBODIMENTS

According to the present invention, a subterranean formation is strengthened by injecting an aqueous gellable composition containing a cross-linkable polymer into the subterranean formation through a wellbore to increase the strength of the subterranean formation.

Suitable polymers are polyacrylamides having a molecular weight ranging from about 50,000 to about 10,000,000 with a degree of hydrolysis from about 0.1 to about 50%. The polymer solution is suitably present in the gellable composition in a range from about 100 parts per million weight (ppmw) up to about 10 weight percent in aqueous solution. The polymer may be cross-linked by trivalent chrome supplied as chrome trichloride, chrome acetate or any other suitable organo chrome compound. The cross-linking chrome ion concentrations can vary from about 1 to about 10,000 ppmw. When the gellable composition is injected through a well with a bottom hole temperature over about 120° F., the wells can be pre-cooled with brine or a delay ligand can be used. Suitable delay ligands are carboxylic acids and their salts, which are desirably present in the aqueous gellable composition in concentrations of about 10 ppmw to about 10,000 ppmw. Organic cross-linkers can also be used for wells having a bottom hole temperature above about 150° F. Some suitable cross-linkers are hydroquinone, hexamethyltetramine, alkanes bearing amines or modified phenols, phenols containing quaternary amines in their structure, and the like. These polymer solutions can be prepared using freshwater or water containing monovalent ions such as seawater. The use of such cross-linkable polymer solutions is considered to be well known to those skilled in the art and a representative system is disclosed in U.S. Pat. No. 5,338,465, issued Aug. 16, 1994 to Thomas P. Lockhart and Paola Albonico. This patent is hereby incorporated in its entirety by reference. Other systems may also be used such as phenolic resins, fufural alcohol resins, and the like, as known to those skilled in the art.

According to the present invention, the aqueous solution containing the cross-linkable polymer is injected into the subterranean formation through the wellbore in at least two portions. A quantity of a non-gellable fluid is injected into the subterranean formation between the two portions. Desirably, the non-gellable fluid is a hydrocarbonaceous material selected from distillable fuels such as diesel fuels, xylene, toluene, mineral oils, and the like, when an oil-bearing formation is treated. When a gas-bearing formation is treated, the non-gellable material desirably consists of a gas such as hydrocarbon gases containing less than six carbon atoms, carbon dioxide, nitrogen and mixtures thereof and the like.

The quantity of the aqueous gellable composition injected is desirably an amount equal to at least a volume sufficient to fill the pore volume of the subterranean formation around the wellbore outwardly for a distance of at least the lesser of one foot or one wellbore diameter. Desirably, the quantity is an amount sufficient to fill the pore volume of the formation out to a distance of about 3 to about 6 wellbore diameters. Typically, when strengthening the subterranean formation to continue the production of fluids therefrom, it is desirable to strengthen the formation in the near wellbore area. With other treatments which are used for water shut-off or other formation control, the gellable composition is typically injected a much greater distance into the formation.

While such gellable compositions, after injection and holding in the formation for a suitable period of time to thicken or gel, are effective to shut off the formation, the shut-off is generally relatively non-selective. In other words, fluids do not flow through the shut-off portions of the formation which may include the entire formation after the injection and set-up of an aqueous gellable composition. In some instances, it may be desirable to shut off substantially the entire area of the formation. In other instances, it is highly desirable to retain the ability of the subterranean formation to produce fluids.

According to the present method, the aqueous gellable composition is injected in slugs or portions with a quantity of non-gellable fluid being injected between the portions. Desirably, a slug of a non-gellable fluid is injected after the last portion of the aqueous gellable composition and thereafter retained in position in the formation with the gellable composition until the gellable composition has gelled. As well known to those skilled in the art, the setting time for the gellable composition can vary substantially depending upon the amount of retarder used in the gellable composition, formation temperature and the like. The injection of the non-gellable material tends to create passageways through the gellable composition which are available subsequently for the production of fluids from the formation outside the treated area around the wellbore. When a post-flush is used, the post-flush material also tends to be present in passageways through the gellable composition as it gels so that when production is resumed, the production can be achieved through the passageways occupied by the post-flush material during the gelling process. As a result of the treatment according to the method of the present invention, the aqueous gellable composition becomes positioned in and around the aqueous components of the formation, such as clays and the like, and around other components of the formation so that the rocks, clays and the like in the formation, are coated with a relatively tough polymeric coating which strengthens these materials and retains them in place. By the process of the present invention, passageways are available through the gel composition to permit the flow of fluids from the formation outside the treated area.

Preferably, the gellable composition is injected in three slugs with a slug of non-gellable fluid being injected between each pair of slugs. It is also desirable that a post-flush slug of the non-gellable material be used. As indicated previously, when the formation is an oil-bearing formation, it is desirable that the non-gellable fluid be a hydrocarbonaceous liquid material. Similarly, when the formation is a gas-producing formation, it is desirable that the non-gellable fluid be a gaseous material.

As indicated previously, while a variety of cross-linkable polymers can be used, polyacrylamides are preferred polymers for use in the method of the present invention.

In the figure, a wellbore 10 is shown extending from a surface 12 through an overburden 14 to an oil- and water-bearing formation 16. Formation 16 is an unconsolidated formation from which finely divided and coarse particulates are produced into wellbore 10 when fluids flow from formation 16 into wellbore 10. Wellbore 10 is cased with a casing 18 which is cemented in place by cement 20 to the bottom of wellbore 10. Casing 18 is perforated in formation 16 with perforations 24. Alternatively, casing 18 may be a slotted liner screen, gravel pack or the like or the well may be completed as an open hole, as known to those skilled in the art, through at least a portion of formation 16. Wellbore 10 also includes a tubing 26 which is positioned to extend from surface 12 to have its lower end 30 near or below the bottom of formation 16. Tubing 26 and casing 18 extend to a wellhead 22 which is a wellhead as known to those skilled in the art for the injection and production of fluids from wellbore 10.

Wellbore 10 also includes a packer 28 to prevent the flow of fluids upwardly between the outside of tubing 26 and the inside of casing 18. The typical position of a gravel pack 34 is shown by dotted lines. By the practice of the present invention, the aqueous gellable composition is injected downwardly through tubing 22 through perforations 24 into an area 32 of formation 16 in slugs with slugs of non-gellable material being injected between the slugs of gellable composition. The gellable composition is then allowed to set in zone 32 to form a strengthened area in formation 16. Formation 16 can then be returned to production with fluids flowing from the areas of formation 16 outside zone 32 through zone 32 and perforations 24 for production through tubing 26. The operation of such wells is considered to be well known to those skilled in the art.

By the method of the present invention, alternating slugs of the aqueous gellable composition and non-gellable fluid are passed into the near wellbore area of a subterranean formation to strengthen the subterranean formation in the area of the well while still retaining the ability of the subterranean formation to produce fluids after the treatment.

Desirably, a pre-flush material is injected into the subterranean formation ahead of the first portion of the aqueous gellable composition. The pre-flush material is suitably a distillate organic fluid such as diesel fuel, xylene, toluene, mineral oil and the like.

The use of divalent ions results in gels which tend to separate water from the gel, thereby increasing the strength of the gel retained in the formation to strengthen the formation. When divalent ions such as calcium are used, they are generally used in quantities from about 0.1 to about 10 weight percent based upon the gellable composition. The method of the present invention strengthens the subterranean formation by consolidating the rock and other formation components in shear strength, in tensile strength, in compressive strength, in cohesive strength and in fracture toughness. The method of the present invention also results in a substantial increase in the permissible draw-down pressure which can be used without the production of solids from the subterranean formation.

When trivalent chrome is used as the cross-linking ion, much lower weight ratios of polymer to chrome ion are used than with normal retarded systems. Weight ratios of polymer to chrome ion below 40:1 are preferred. This results in a stronger network and less susceptibility to the removal of the resulting polymer by water production.

The quantity of the aqueous gel injected is selected to be a quantity sufficient to fill at least the pore volume of a section of the subterranean formation surrounding the wellbore out to a distance of at least the lesser of one foot or one wellbore diameter. Typically, the formations are treated for strengthening out to a distance of about six wellbore diameters from the wellbore. Accordingly, the quantity of aqueous gellable composition injected is desirably equal to the pore volume of the formation extending radially outwardly from the lesser of one foot or one wellbore diameter to about six wellbore diameters.

Desirably, the aqueous gel composition is injected in three slugs. Generally, the slugs injected are of approximately the same volume and, according to the method of the present invention, slugs of non-gellable material are desirably injected between the slugs with a final slug of non-gellable material functioning as a post-flush. Desirably, the slugs of non-gellable material are approximately the same volume as the slugs of gellable composition injected. While the size of the slugs can be varied, it is desirable that at least two slugs of gellable composition be used with a slug of non-gellable material between the two slugs of aqueous geluable composition. It is desirable that a post-flush also be used. The post-flush slug may be up to about 4 times the volume of the gellable slugs.

Having thus described the present invention by reference to its preferred embodiments, it is respectfully pointed out that the embodiments described are illustrative rather than limiting in nature and that many variations and modifications are possible within the scope of the present invention. Such variations and modifications may appear obvious and desirable to those skilled in the art based upon a review of the foregoing description of preferred embodiments.

Having thus described the invention, we claim:

1. A method for strengthening a subterranean formation in the near wellbore area by injecting an aqueous gellable composition containing a cross-linkable polymer and a cross-linking ion into the subterranean formation through a wellbore into the near wellbore area to increase the consolidation and cementation of the subterranean formation in the near wellbore area while retaining the ability of the subterranean formation to produce fluids from outside the near wellbore area, the method consisting essentially of:

a) injecting a quantity of the aqueous gellable composition sufficient to fill a pore volume of the subterranean formation around the wellbore outwardly for a distance of about three to six wellbore diameters into the subterranean formation in at least two portions;

b) injecting a quantity of a non-gellable liquid into the subterranean formation between the at least two portions; and, c) retaining the aqueous gellable composition and the non-gellable liquid in the near wellbore area extending outwardly from the wellbore for the distance of from about three to six wellbore diameters until the gellable composition has gelled to strengthen the near wellbore area and create pores through the gellable composition in the near wellbore area for the production of fluids from outside the near wellbore area through the wellbore.

2. The method of claim 1 wherein the subterranean formation is a weakly consolidated or weakly cemented formation.

3. The method of claim 1 wherein the subterranean formation contains water dispersible clays.

4. The method of claim 1 wherein the subterranean formation is pre-flushed before injection of the aqueous gellable compositions with a distillate organic liquid.

5. The method of claim 4 wherein the distillate organic liquid is selected from the group consisting of diesel fuel, xylene, toluene and mineral oil.

6. The method of claim 1 wherein the aqueous gellable composition is injected in three portions and a first quantity of the non-gellable liquid is injected between a first and a second portion of the aqueous gellable composition and a second quantity of the non-gellable liquid is injected between the second portion and a third portion of the aqueous gellable composition.

7. The method of claim 1 wherein the non-gellable liquid is a hydrocarbonaceous liquid.

8. The method of claim 7 wherein the hydrocarbonaceous liquid is selected from the group consisting of diesel fuel, crude oil, refined oils and mineral oils.

9. The method of claim 1 wherein a post-flush of the non-gellable liquid is injected after injection of a last portion of the aqueous gellable composition.

10. The method of claim 1 wherein the two portions contain about equal quantities of the aqueous gellable composition.

11. The method of claim 1 wherein the quantity of non-gellable liquid is equal to at least about one-half of the quantity of the aqueous gellable composition.

12. The method of claim 1 wherein the cross-linkable polymer is a polyacrylamide.

13. The method of claim 12 wherein the aqueous gellable composition contains a polyvalent cation.

14. The method of claim 13 wherein the polyvalent cation is trivalent chrome.

15. The method of claim 13 wherein the polyvalent cation is a divalent cation.

16. The method of claim 1 wherein the wellbore is completed as a cased well.

17. The method of claim 1 wherein the wellbore contains at least one of a slotted liner, a screen and a gravel pack.

18. The method of claim 1 wherein the wellbore is an open hole through at least a portion of the subterranean formation.

* * * * *